Oct. 28, 1947.   N. B. WALES   2,429,736
AUTOMATIC TOASTER
Filed May 23, 1945   2 Sheets-Sheet 1

INVENTOR.

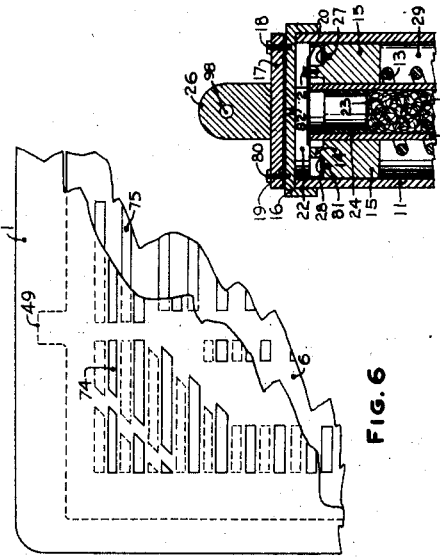
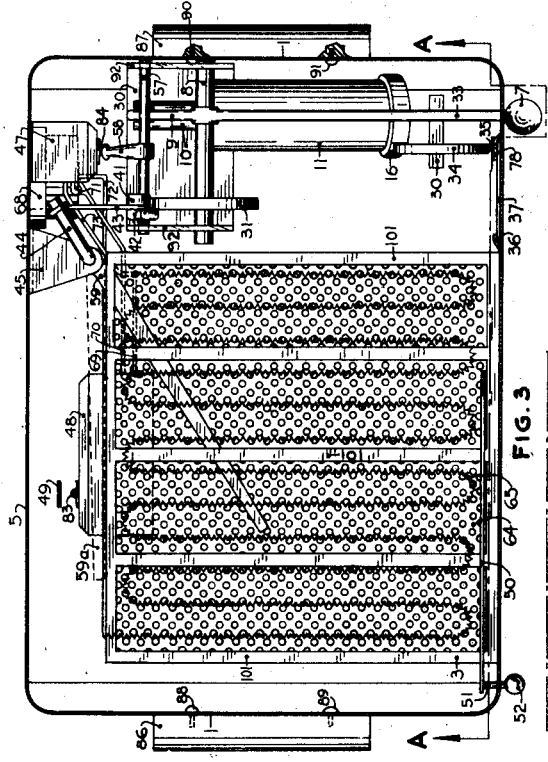
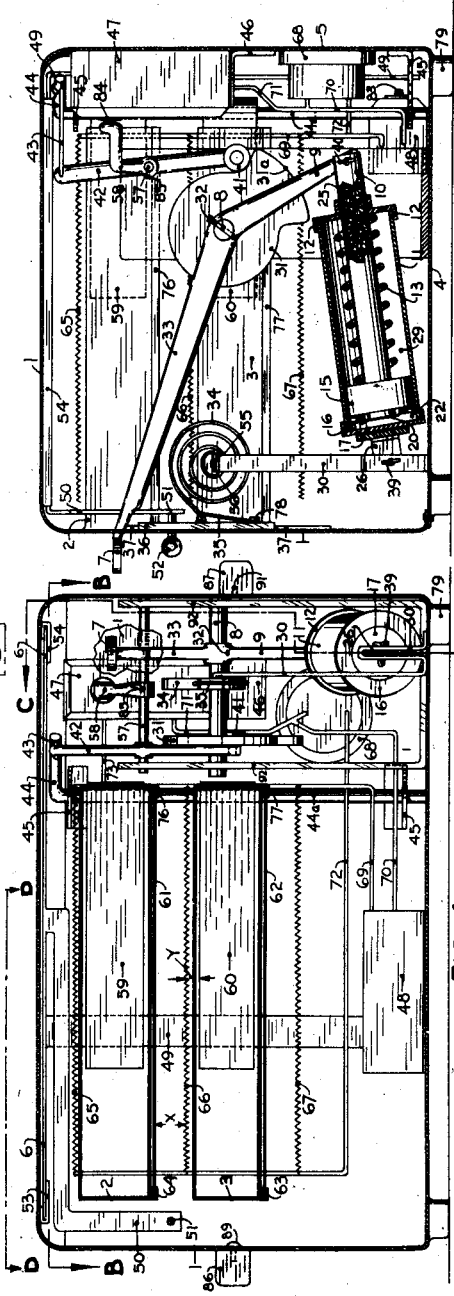

Patented Oct. 28, 1947

2,429,736

UNITED STATES PATENT OFFICE 2,429,736

AUTOMATIC TOASTER

Nathaniel B. Wales, New York, N. Y., assignor, by mesne assignments, to Industrial Patent Corporation, New York, N. Y., a corporation of New York Application May 23, 1945, Serial No. 595,418

4 Claims. (Cl. 219—19)

This invention relates to improvements in thermostatically controlled automatic toasters, in which the degree of toasting on each toasting cycle, as selectively chosen by the operator, is effected by depressing a single manual cyclic lever, which automatically performs the function of compensating for the changing temperature level of the toasting ovens.

In contrast to the conventional method of thermostatically compensating the timing mechanism, or, the variable release of the toasting carriage, through its latch or other portions of the mechanism, which performs the timed cycle, or, varying the heat intensity of the ovens, in this invention the operator unknowingly performs this compensating function.

In the type of automatic toaster, of which the accompanying drawings show one embodiment, and my co-pending patent application, Serial Number 556,722 shows another embodiment, one operational lever is depressed, and by this single operation the timer is energized, or its spring wound, the toasting carriage is moved into toasting position, the switch for the toasting ovens is closed, and the operator selects the kind of toast desired, such as "light," "medium," or "dark."

This last function of selection is done by the degree to which the lever is depressed, as indicated by a very legibly index dial, placed behind or beside the lever. If the dial is mechanically, or operatively, connected to a thermostatic element, so that its movement reflects the rise in temperature of the toasting ovens after a previous cycle of toasting, the dial is thereby shifted in its position relative to the lever's initial or "off" position. Should the operator again desire "medium" toast, but by the above described means, the "medium" position, indicated on the dial, has moved to that position as dictated by the thermostat, giving a shorter interval required for the next toasting operation, when the operator depresses the lever to "medium" from its "off" position, he has unknowingly become an instrument in the ensuing compensated toasting interval, as reflected by the thermostat.

Another object of my invention is to provide a toaster that will toast a plurality of slices of bread, or the like, in a horizontal position, and wherein I utilize heat diffusers interposed between the under side of the slice and the electric heating grid in order to have the slices evenly toasted on both sides.

The active toasting medium effective on the upper side of the slice is radiant heat only, as compared with radiant heat plus the heat of convection effective on the under side of the slice of bread, or the like. By using the heat diffusers I compensate for this differential of toasting effect.

A further object is to utilize the heat arising from the compactly stacked series of electric heater elements, for manually controlled cooking and the like.

A further object is to make available the radiant heat factor from the topmost toasting element and the heat of convection arising from the stacked heating elements therebelow, by utiliziing this heat through an open grid directly onto a cooking vessel resting thereon, and to take advantage of the manual opening and closing of this grid, to turn on and off, respectively, the electric current for said heating of said vessel.

Another object is to utilize the manually opened grid to expel crumbs, and the like, which collect within the confines of the toaster case, and thereby obviating the need of a crumb drawer, or other crumb removal means.

Further objects and details will be more specifically described and illustrated in the accompanying drawings and specification, in which:

Figure 3 is a plan view taken on line B—B in Figure 4.

Figure 4 is a section in front elevation taken on line A—A in Figure 3, except a fragment around the control lever which is in exterior elevation.

Figure 5 is an end elevation taken on line C—C in Figure 4.

Figure 6 is a fragment plan view taken on line D—D in Figure 4, showing the relative position of the grid openings in the top of the toaster case, and shown in their closed position.

Figure 7 is an enlarged view in full section of the dash-pot type of timer, as shown, partially in section, in Figure 5.

Referring to the several drawings in which I have shown one embodiment of my invention, similar numerals refer to similar parts.

Figure 1:
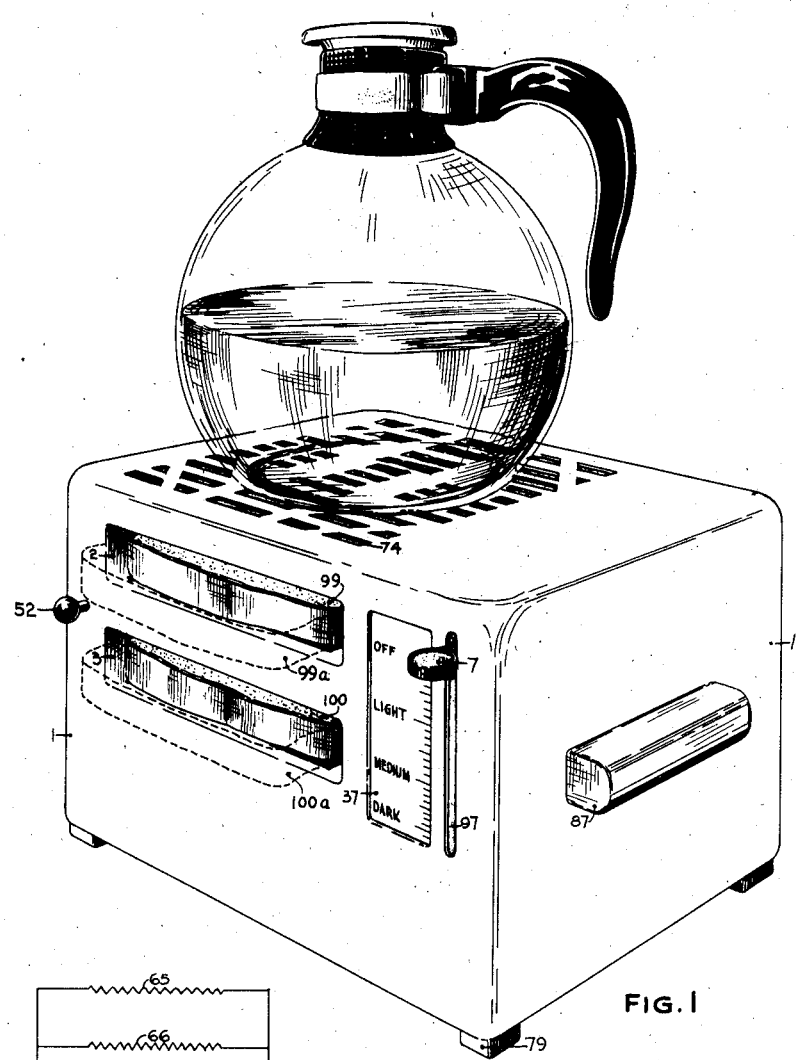
Figure 1 is an elevation in perspective.

Numeral 1 is the front and top of the case, 2 and 3 are the toasting compartments respectively, placed one above the other. 4 is the bottom, and 5 is the rear of the case, arranged to be detached as a unit from the front and top of the case 1. For ease of assembly and servicing, all of the operative mechanism is secured to the bottom 4 and rear 5 of the case 1, so that it can be taken out as a unit, with the exception of knob 52, which controls the grid shutter 6. Cyclic control key 7 may be made detachable, so that operational lever 9, fulcrumed on shaft 8, and secured thereto by pin 32, may permit its major arm 33 to be withdrawn in toto with the rest of the mechanism when so required. Shaft 8 is journaled on the U-shaped supports 92, suitably secured to base 4.

The cyclic toasting timer is made in the form of a dash-pot, comprising piston rod 10 in tube form, pivoted on lever arm 9 by cotter pin 40, tubular piston rod 10 is guided by element 12, secured to cylinder 11, and is suitably secured to piston 15, see Figure 7.

A cylinder head 16 is secured to cylinder 11 by any conventional means. In cylinder head 16 is an orifice 82, which is the exhaust port for cylinder 11. Inasmuch as an extremely small orifice is necessary to restrict the egress of air from space 22, in order to obtain an adequate timed interval for the dash-pot type of timer, when air is drawn into cylinder 11, through the tube 10, when key 7 is depressed, the air entering the space 22, between piston 15 and cylinder head 16 and past the synthetic rubber flap air-intake valve 20, is forced out of an annular formed orifice, by superposing plate 17 on the top of the cylinder head 16, spaced therefrom by shims 19, say one thousandth of an inch in thickness, the annulus so generated can be easily manufactured, and in this manner I am able to obtain the necessary restriction, without having orifice 82 too small for practical purposes, and in constant danger of being clogged by dirt.

A centrally positioned ear 26, secured to plate 17, has a hole 98 which is the axis point on which cylinder 11 oscillates. A cotter pin 39 passed through companion holes in the pedestal 30 forms this oscillating bearing for cylinder 11. A compression spring 13 is interposed between the piston 15 and cross-head element 12, and maintains lever 33 and key 7 in the "off" position, as shown in Figure 5, except, when key 7 is manually depressed, causing piston 15 to be forced inwardly against spring 13, compressing the same, and by its movement, to draw in air through the hollow tube 10, past the air filter 25, which is retained by screen 23 at its piston end, and forces open flap-valve 20 by relative vacuum created between piston 15 and cylinder head 16, and fills with air the cylinder volume as displaced by the movement of piston 15. The further key 7 is depressed the more air is drawn in by the greater displacement and the longer will be the interval required for the air to pass through the restricted annulus at the outer end of orifice 82 by the energy impressed thereon by spring 13.

On shaft 8 is suitably secured cam 31, which is engaged by cam-roller 41, mounted on lever 42, which is fulcrumed on and secured to shaft 57, journaled in supports 92. At the upper end of lever 42 is a wire member 43, connecting lever 42 with crank arm 44, and as lever 42 and crank arm 44 are journaled at right angles to one another and turn in a restricted arc, wire member 43 has tolerance in its respective connections to accommodate such movement. Crank arm 44 is integral with vertical shaft 44a, journaled in bearings 45. Rigidly secured to shaft 44a is finger 59, located in the rear of bread toasting recess 2, and finger 60 located in recess 3. It can now be seen that when lever 9 and its major arm 33 is moved by depressing cycle control key 7, the toast ejection fingers 59 and 60 recede in oven recesses 2 and 3 respectively, to a position as indicated by the dotted outline 59a in Figure 3, permitting a slice of bread to be inserted into each of the toasting recesses 2 and 3. Coincident with the above described movement of lever 42 with its train of connecting parts, which actuate fingers 59 and 60, the arm 58 secured to shaft 57 by pin 85, see Figure 5, moves away from the switch button 84 of the micro-switch 47, and micro-switch 47 closes its circuit and energizes electric heating resistance wires 65, 66 and 67. The diagrammatic electric connections for this circuit are clearly shown in Figure 2.

It should be noted that the contour of cam 31 has a constant radius on segment 31a, so that when key 7 is depressed to a very slight degree its depression causes switch 47 to close, and remain closed, no matter how far key 7 is depressed. Likewise, the toast ejection fingers 59 and 60 recede as dictated by the same cam contour 31a and remain unchanged in their receded position in ovens 2 and 3 no matter how far key 7 is depressed, in order to prolong the time interval for toasting, as is determined by the proportionately greater air displacement generated by piston 15 in its movement on cylinder 11.

Referring to the bi-metallic thermostatic coil 34, which is positioned in close proximity to oven 3, and reflects the changing temperature, characteristic of ovens 2 and 3, after each cyclic toasting. The inner end of thermostatic coil 34 is secured by a suitable rivet 56, or the like, to pedestal 30, which is shown in Figures 4 and 5 as formed in one piece, and is suitably bent to also form the support for oscillating cylinder 11. The other end of thermostatic coil 34 is linked by a suitable wire, or the like, 35, which is in turn connected at 78 to the rear surface of dial 37, which is slideably retained by guides 36 in the front panel of case 1, as is shown in Figures 1 and 3.

Thermostatic element 34 is so designed and positioned that its coil unwinds with an increase of temperature; hence, the dial 37 rises in its slide retainers 36 during a cycle of toasting, as ovens 2 and 3 operate under approximately identical conditions. While key 7, located in slot 97 is in its top or "off" position, as dictated by the contour of cam 31 remains stationary, dial 37 with its indices of "light," "medium" and "dark," or their equivalent, moves relatively upward in respect to key 7 during the change of temperature, and the operator on depressing key 7 to that extent which he deems desirable, in accordance with the above indices, becomes an instrument in the sequence of steps comprising the automatic thermostatic control of the toaster.

To open grid openings 74, see Figure 1, in the top of the toaster case 1, in order to effectively heat or cook on the top thereof, as well as to turn on the current for supplying heat for such cooking, the operator pulls out knob 52 secured to stem 51, which is fastened to off-set arm 50, secured to grid plate shutter 6, slideably sustained in slides 53 and 54, see Figure 4. At the rear end of shutter 6, see Figures 3 and 6, is an off-set depending arm 49, which extends downward to the micro-switch 48, as seen in Figure 4.

When shutter 6 is pulled toward the front of the toaster, the grid openings 75 therein, see Figure 6, come into register with grid openings 74 in the top of case 1, and permit a degree of radiant heat and the heat of convection to pass therethrough; coincidently, depending arm 49 contacts the control button 83 of switch 48, see Figure 5, and the circuit is closed to energize heating elements 65, 66 and 67. Conversely, when knob 52 is pushed inwardly, switch 48 breaks the circuit with heating elements 65, 66 and 67, and the grid openings 74 are closed. It is manifest to those skilled in the art that interlocking means can be interposed between switches 47 and 48 so that when the automatic toasting cycle is in operation switch 48 will not function.

In order to compensate for the differential between a radiant-heat source only, on the upper side of each slice of bread, or the like, as it is toasted in a horizontal position, as compared with the lower side of said slice, which is exposed to radiant heat and the heat of convection as well, to attain an even toasting of both sides of the slice of bread, I interpose, between the heating elements 66 and 67, heat diffusers 61 and 62, sustained on their edges by members 63, 64, 76 and 77. These diffusers 61 and 62 are minutely perforated metallic sheets, which screen to a predetermined degree the radiant heat factor and act also as baffles against the heated air current arising by the heat of convection. The respective distances "X" and "Y" in Figure 4 also must be carefully considered in the design, "X" being the distance of the toasting element 66 from the heat diffuser 61, and "Y" being the distance from the top of a slice of bread in oven recess 3 to the toasting element 66.

Suitable insulative handles 86 and 87 secured to case 1 by screws, or the like, 89 and 91 are provided.

Case 1 has foot supports 79 preferably made of non-scratching and heat insulating material.

Figure 2:
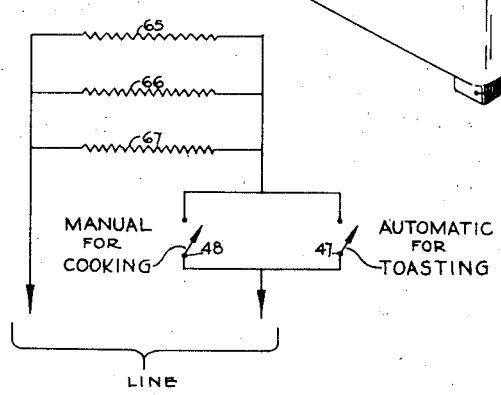
Figure 2 is a schematic diagram of the manual and automatic electric control circuits.

A conventional electric supply socket 68 positioned on the rear panel 5 is suitably connected by wires 70, 71, 72, 73 to form the electrical circuit as is shown in Figure 2.

The operation of my automatic toaster is briefly described as follows:

Slices of bread or the like are partially inserted in toasting recesses 2 and 3 respectively in positions as are shown in dotted lines 99a and 100a, in Figure 1, the ejection fingers 59 and 60 preventing their further entry as they are in a position as shown in Figure 3. The operator depresses key 7 in slot 97 to that extent where key 7 comes opposite the degree of toasting desired, as for instance, "medium" on dial 37. The ejection fingers have now receded into positions indicated by dotted lines 59a by the positive turning of cam 31 actuated by key 7 as has already been described in detail. The operator may now push the slices of bread completely back into the toasting position as is indicated in Figure 1 by numerals 99 and 100. Of course, the operator may depress key 7 first and then insert the slices to be toasted in ovens 2 and 3 in their normal toasting position. It should be noted that the slices of bread rest on a plurality of narrow, spidered, support-members 101, in toasting recesses 2 and 3. At the same time that fingers 59 and 60 recede, switch 47, by the movement of cam 31 and the consequent movement of lever 42, shaft 57, and switch actuating arm 58, is put in the "on" position and electric heating elements 65, 66 and 67 are energized.

When the toasting control-timer, as is represented by the dash-pot effect of piston 15, under the force of compressed spring 13 in cylinder 11, has reached its terminal position therein, expelling in the interim the charge of compressed air, drawn in through flap valve 29, and which has escaped during this predetermined interval through the minute annular orifice formed by orifice 82 and plate 17, the cam 31 returns to a position as is shown in Figure 5 and roller 41 has fallen from cam segment 31a causing ejection fingers 59 and 60 to assume their toast "ejection" position as is shown in Figure 3. Simultaneously switch 47 is moved into its "off" position thereby de-energizing heating elements 65, 66 and 67. The toasted slices are now in an accessible position as indicated by the dotted lines 99a and 100a.

If the operator immediately desires additional slices of toast, the same procedure, as above described, is repeated, but, as and when, the operator depresses the key 7 to "medium" on dial 37, the heat level of the oven has increased in the interim since the start of the initial toasting operation and the thermostatic element 34 has shifted upward to a predetermined degree the relative position of "medium" as indexed on dial 37, in its relation to the static initial position of key 7, hence the operator does not depress the key 7 quite so much as was done on the initial toasting cycle and the toasting interval is thereby comparatively shortened, and the toast, when ejected, on the second cycling is toasted to the same degree as after the first toasting cycle.

It is evident that the mechanism as herewith described does not show any linkage, mechanical or otherwise, between the thermostatically controlled dial 37 and the timing mechanism. The thermally responsive means 34, in no manner determines, or fixes, the duration of the toasting interval. The duration of the toasting interval is entirely subject to the operator's skill in actuating the key 7, which may, or may not, be in accord with the proper depression of key 7, as is indicated by the dial 37. The operator may even alter the degree of depression of key 7 after it is initially depressed, and the toasting cycle has begun, in order to change the toasting degree of the toast, if the operator so desires.

What I desire to protect and claim by United States Letters Patent is encompassed in the following claims:

1. In a bread toaster having a toasting oven for bread slices, means for initiating the toasting of said bread slices in said oven, manually set means for determining the duration of said toasting, an indicating member responsive to the setting of said manually set means, a movable index dial for said manually operated indicating member, and thermally responsive means for varying the position of said index dial with respect to the initial postion of said indicating member and in accordance with the temperature within said oven whereby automatic compensation for initial-temperature-induced changes in the time of operation required for toasting to a selected degree is obtained.

2. In a bread toaster having a toasting oven for bread slices, means for initiating the toasting of said bread slices, a manual control member, timing means for determining the duration of said toasting, said duration being a function of the manual displacement of said control member from an initial "off" position, a movable scale to index the manual displacement of said control member, and thermostatic means, responsive to the temperature in said oven, for positioning said scale with respect to said initial position of said control member, whereby automatic compensation for initial - temperature - induced changes in the time of operation required for toasting to a selected degree is obtained.

3. In a bread toaster comprising a case therefor and having a toasting oven for bread slices, means for initiating the toasting of said bread slices in said oven, an index plate visibly positioned in said case, and movably mounted in relation to said case, manually set timing mechanism for determining the duration of said toasting, an indicating member responsive to the manual setting of said timing mechanism, and means for varying the position of said index plate with respect to the initial position of said indicating member and in accordance with the temperature within said oven, whereby automatic compensation for initial-temperature-induced changes in the time of operation required for toasting to a selected degree is obtained.

4. In a bread toaster having a toasting oven for a slice of bread, means for initiating the toasting of said bread slice in said oven, a manual control member, timing means for determining the duration of said toasting, said duration of said toasting being a function of the displacement of said control member from an initial "off" position, an index member to indicate the manual displacement of said control member, and thermostatic means responsive to the temperature of said oven, for positioning said index member with respect to said initial "off" position of said control member, whereby automatic compensation for initial-temperature-induced changes in the time of operation required for toasting to a selected degree is obtained.

NATHANIEL B. WALES.

REFERENCES CITED

The following references are of record in the file of this patent:

UNITED STATES PATENTS

| Number | Name | Date |
|---|---|---|
| 1,952,626 | Johnson | Mar. 27, 1934 |
| 2,101,062 | Graham | Dec. 7, 1937 |
| 2,129,360 | Purpura | Sept. 6, 1938 |
| 2,193,972 | Lavenburg | Mar. 19, 1940 |
| 2,337,124 | Olving | Dec. 21, 1943 |
| 2,339,183 | Myers | Jan. 11, 1944 |
| 2,358,766 | Lucia | Sept. 19, 1944 |
| 2,363,294 | Carrier | Nov. 21, 1944 |